R. Allison,

Boring Machine,

Nº 58,568. Patented Oct. 9, 1866.

Witnesses:

Inventor:

UNITED STATES PATENT OFFICE.

ROBERT ALLISON, OF PORT CARBON, PENNSYLVANIA.

IMPROVEMENT IN BORING-MACHINES.

Specification forming part of Letters Patent No. 58,568, dated October 9, 1866.

*To all whom it may concern:*

Be it known that I, ROBERT ALLISON, of Port Carbon, in the county of Schuylkill and State of Pennsylvania, have invented a new and Improved Portable Boring-Machine; and I do hereby declare that the following is a full, clear, and exact description thereof, which will enable others skilled in the art to make and use the same, reference being had to the accompanying drawings, forming part of this specification, in which—

Figure 1:
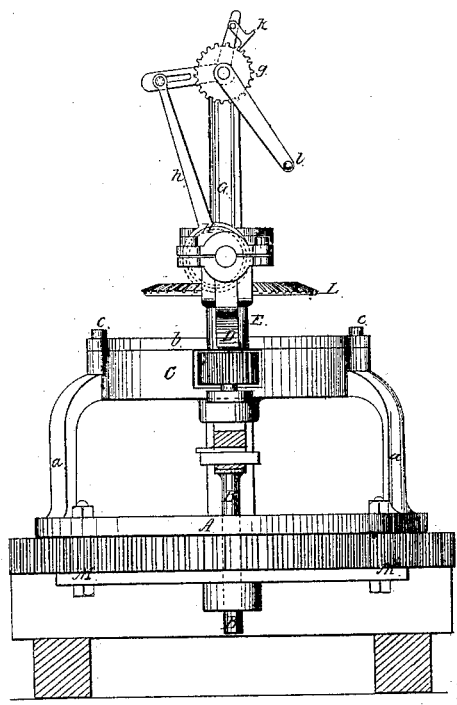
Figure 2:
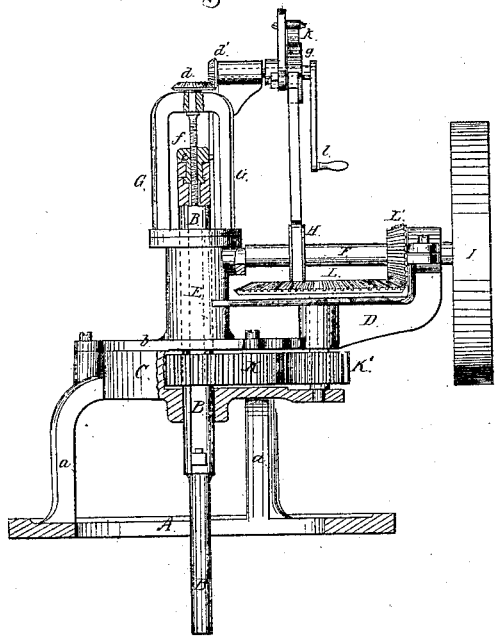
Figure 3:
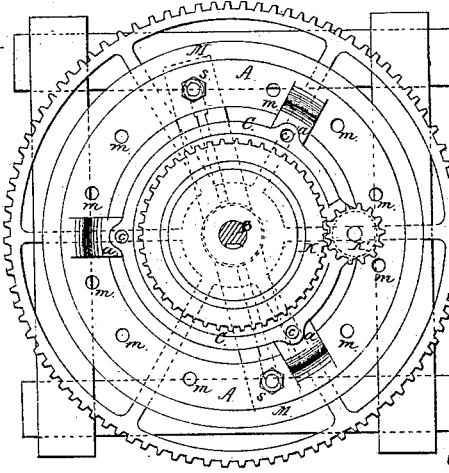

Figure 1 is a side elevation of the machine placed on a wheel for boring. Fig. 2 is a partial central vertical section. Fig. 3 is a transverse horizontal section taken in the line $x\,x$, Fig. 1.

Similar letters of reference indicate like parts.

The nature of this invention consists in providing a novel portable tool for boring or reaming the shaft-holes in large cast-iron fly or cog wheels, pulleys, spiders, &c., conveniently, expeditiously, and cheaply.

Proprietors of small machine-shops in the country cannot afford to put up a lathe of sufficient capacity to do this kind of work, and the practice prevails very generally among them of putting on their large wheels, pulleys, &c., with a number of keys, involving a slow and expensive labor in cutting key-seats, fitting the keys, and staking the shaft true; and even in large establishments where there may be a suitable horizontal boring-lathe it requires frequently a great deal of time and labor to move large wheels into the machine-shop and set them properly. In all such cases this portable boring-machine can be taken to the work, and if not convenient to power, it can be run with a small portable engine, or even by manual power. The machine can be set readily for doing the work, not requiring one-fourth of the time required to set the work on a horizontal lathe, and doing about double the work the lathe can do.

The machine is made wholly of metal, very compact and strong in all its parts, and of any required size to suit different work.

A represents a base-plate or flat cast-iron ring, which is turned perfectly true on the top, bottom, and edge to a spindle or boring-arbor, B B. The base-plate A has standards or legs $a\,a\,a$, upon which is a wheel-box, C, all cast on together and supporting the upper parts of the machine. A cover, $b$, sets on the box C, fastened to it with screw-bolts $c\,c\,c$. An arm, D, extends from a sleeve, E, on the middle of the cover, which supports the running-gear and pulley-shaft F. An open column frame or cap, G, is bolted on the top of the sleeve E, through which passes the upper part of the boring-arbor B, which is hollow in the upper end and receives the feed-screw $f$, that is carried by a thimble, $e$, keyed on the end of the boring-arbor B, as shown by Fig. 2 in section. The arbor turns, while the thimble $e$ slides up and down in a guide-slot on the inside of the frame G, when feeding.

The feed apparatus consists of a small bevel, $d$, on the upper end of the feed-screw, which is worked by a smaller bevel, $d'$, on the end of a small arbor carrying a ratchet-wheel, $g$, on the other end, and turned by the eccentric H, set on the pulley-shaft F. The eccentric-rod $h$ has a slotted arm, $i$, for adjusting the feed to the work, and by throwing the small latch $k$ over on one side or the other it will feed down or up. For quick work in reversing the feed the bell-crank $l$ can be used.

The pulley I is put on the shaft F with a set-screw, so as to be changed for different sizes of hole, in the wheel to be bored. In the box B is the driving-wheel K, turned by a pinion, K', at the side of the box, worked by bevel-gear wheels L, Figs. 2 and 3, on a shaft running through the arm D and L' on the pulley-shaft F.

For boring deep holes the guide-bar M M is bolted at $s\,s$, Fig. 3, on the under side of the wheel to be bored, so as to steady the boring-arbor, as shown in Fig. 3. For boring large holes a cutter-head is put on the spindle or boring-arbor.

The mode of using the machine is to have a differential-pulley block hung on some convenient part of the shop, hoist the machine up with the boring-arbor in a vertical position, run the wheel or spider to be bored (elevated upon blocks) under the machine, which is then lowered and centered by the base-plate A. Lay a straight-edge on the top of the base-plate and measure three or four points on the outside of the wheel or spider, put in two bolts, $s\ s$, through the holes $m\ m\ m$ in the base-plate, Fig. 3, and it is ready to work.

Having fully described the object, construction, and operation of my invention, what I claim as new, and desire to secure by Letters Patent, is—

1. A portable boring-machine for boring or reaming shaft-holes in cog-wheels, spiders, pulleys, &c., constructed and operated substantially as herein described and represented.

2. The base-plate or ring A, in combination with the vertical boring-arbor B and guide-bar M, substantially as and for the purposes herein specified.

3. The vertical boring-arbor B, in combination with the base-plate A, clamping-bar M, or its equivalent, and the feeding apparatus, arranged and operated substantially in the manner and for the purposes herein set forth.

4. The guide-bar M M, in combination with the base-plate A and the boring-arbor B, arranged and applied substantially as and for the purposes herein described.

ROBERT ALLISON.

Witnesses:
 LEWIS W. SNYDER,
 FRAS. B. BANNAN.